June 6, 1967    A. CANTARUTTI ET AL    3,323,969
TIRE FABRIC HANDLING APPARATUS
Filed Sept. 10, 1963    6 Sheets-Sheet 1

FIG_1

INVENTORS
ARMINDO CANTARUTTI,
JAMES L. GIFFELS &
BY EDWIN E. MALLORY

Oberlin, Maky & Donnelly
ATTORNEYS

FIG_10

FIG_11

FIG_12

FIG_13

United States Patent Office 3,323,969
Patented June 6, 1967

3,323,969
TIRE FABRIC HANDLING APPARATUS
Armindo Cantarutti, Cuyahoga Falls, and James L. Giffels, Akron, Ohio, and Edwin E. Mallory, Niles, Mich., assignors to NRM Corporation, a corporation of Ohio
Filed Sept. 10, 1963, Ser. No. 307,852
42 Claims. (Cl. 156—361)

This invention relates generally, as indicated, to tire fabric handling apparatus and more particularly to an automatic bias cutter let-off line assembly.

In the construction of pneumatic tires, tire carcasses of generally cylindrical form are built on collapsible drum tire building machines which require the delivery to such drum of many different strips of tire building materials and tire cord reinforced fabric which comprises the plies of the carcass. Each successive ply of the carcass generally has the cords thereof biased in opposite directions. The fabric must be delivered to the drum in such a manner as to preclude unevenness or stretching of the fabric material which may result in a defective tire.

The ply stock fabric, which is of a relatively flimsy and tacky nature, is produced on calenders and the reinforcing cords therein extend longitudinally of the strip. Rolls of the ply stock fabric are fed to a high table bias cutter which severs such fabric to the desired width. The severed sections may then be joined together to form a strip of tire fabric material wherein the reinforcing cords extend parallel to each other but at the desired biased angle. Such strips thus formed may then be fed to servicers for each of the drum type tire building machines to be stored for convenient application to the machine by the machine operator. A single high table bias cutter may, for example, supply the needs of eight or more servicers and tire building machines and the operator thereof may then program the materials being fed to such servicers and machines in accordance with the size and type of tires to be produced. It will, of course, be understood that varying types of tires require many different types of materials. Accordingly, the operator must frequently change over from one type of material to another. The proper feeding of materials to the high table bias cutter generally requires a substantial amount of manual handling of the fabric material which often results in stock stretching or distortion. Such manual handling is needless to say quite time consuming whereby the bias cutter is not used to its optimum efficiency. Furthermore, a bias cutter utilized at optimum efficiency requires frequent changing of the rolls of fabric material from the calender in that they will be used up rather rapidly. The proper feeding of such material is also quite difficult because the feed of the material stops during the cut which may occur up to 20 times per minute.

It is accordingly a principal object of the present invention to provide an automatic bias cutter let-off line assembly which will permit rapid change-over from one source of supply to another for the bias cutter.

Another principal object is the provision of such line assembly which will provide the bias cutter with convenient sources of supply of a variety of types and sizes of tire fabric material.

Another object is the provision of a let-off line assembly for bias cutters wherein manual handling and threading of the fabric material is largely avoided.

Still another object is the provision of such line assembly which will supply the bias cutter quickly and conveniently with a variety of tire fabric materials in a distortion free condition.

A further object is the provision of a let-off line assembly for bias cutters which will facilitate the programming of the production of tire carcasses.

Still another object is the provision of a bias cutter let-off line assembly having a plurality of units from the selected one of which fabric can be fed automatically to the bias cutter, rewound on the unit and another selected unit then employed.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

(I) *General arrangement*

Figure 1:
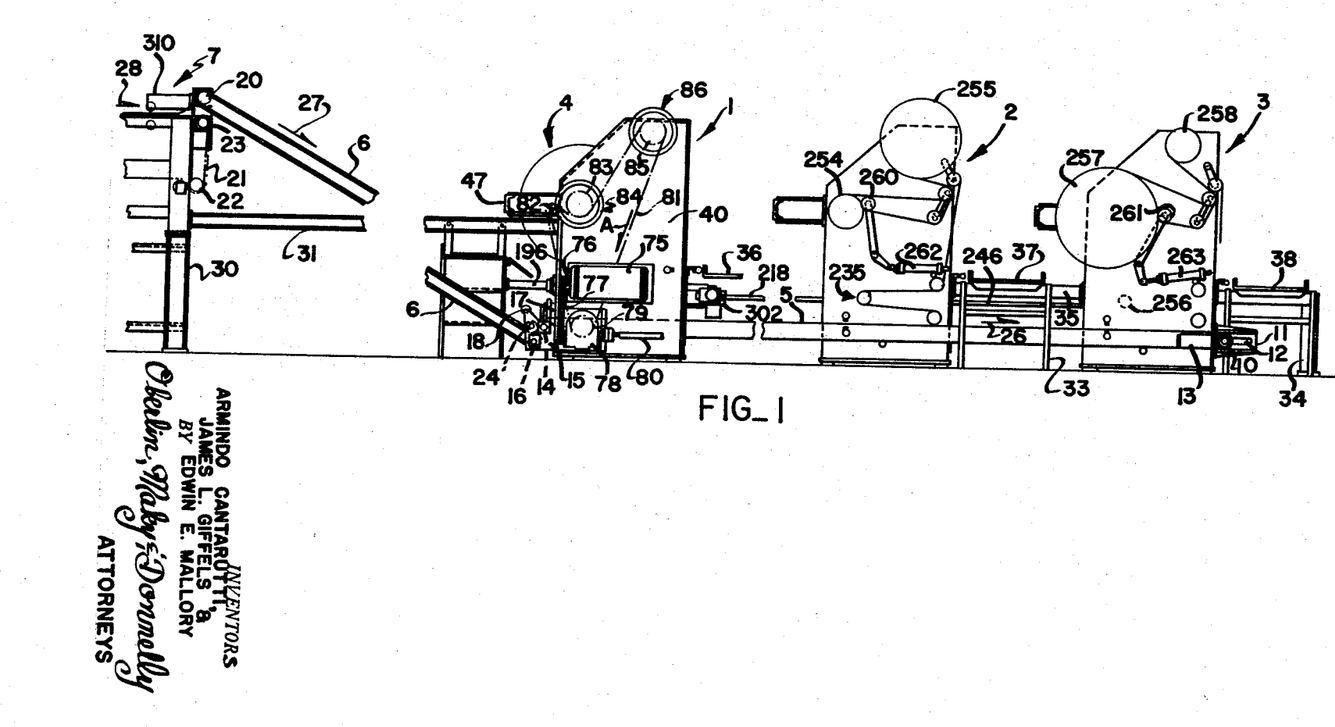
FIG. 1 is a fragmentary side elevation of an automatic bias cutter let-off line assembly in accordance with the present invention illustrating but three of the plurality of units that may be employed in such assembly.

Referring now to the annexed drawings with more particularity and especially to FIG. 1, there is illustrated a plurality of let-off units 1, 2 and 3 which may be termed respectively, a first unit, an intermediate unit, and an end unit. Such units are adapted to support rolls of tire fabric material illustrated at 4 which have been brought from the calendar unit by a suitable overhead conveyor or the like and such rolls comprise convoluted interposed layers of such fabric material and a liner separating adjacent layers of fabric. Due to the tacky and flimsy nature of the material, the liner is employed to avoid direct fabric material intercontact. The units 1, 2 and 3 are aligned in a direction normal to the axes of the stock rolls and are joined by an elongated conveyor 5 passing horizontally through the bottom of such units. The conveyor 5 is joined to an inclined conveyor 6 leading from the bottom of the first unit 1 to a high table fully automatic bias cutter 7. The tire fabric generally has reinforcing cords therein extending longitudinally thereof and the high table bias cutter will then sever such fabric strip into a multiplicity of oblique parallelogram segments which will then drop to a splice table to be spliced together to form an elongated strip having the fabric cords therein extending at an angle. The fabric may then be fed into a line of tire building machine servicers for storage and dispensation to the respective operators at the tire building machine drums.

The operator of the entire line may be at the splice table which is at the opposite end of the bias cutter shown in FIG. 1 and through suitable controls is able to select the material from any one of the units 1 through 3, cut such material as required, rewind the material into the selected unit, and select a further material in a different unit, completely automatically.

Whereas there are only three units illustrated in FIG. 1, it will be understood that as many intermediate units as desired may be employed. For example, a total of eight units has been found to be feasible and, of course, the intermediate unit 2 and last unit may be omitted so that only the first unit or a single unit let-off line is provided. Needless to say, this invention is not intended to be confined to any particular number of units in the let-off line assembly.

The conveyor 5 may comprise a plurality of belts laterally spaced and trained about an elongated pulley 10 mounted in brackets 11 in the end unit 3 for longitudinal movement in elongated slots 12 by means of air springs 13. The opposite ends of the belts of the conveyor 5 are trained about fixed pulley 14, the axis of which forms a pivot for brackets 15 which support the bottom pulley 16 of the inclined conveyor 6. Air springs 17 urge the brackets 15 in a counterclockwise direction as viewed in FIG. 1 about the pivot provided by the axis of the pulley 14 thus maintaining the belts of the conveyor 6 under proper tension. An idler roll 18 extends between the brackets 15 at each side of the first unit 1 and such roll serves to limit peel off of the fabric during the rewinding operations. The belts of the inclined conveyor 6 are also trained about a pulley 20 at the top of the bias cutter 7 and such inclined conveyor serves to deposit the tire fabric material on the belts of conveyor 21 which is trained about pulleys 22 and 23 at the illustrated end of the bias cutter. The conveyors 5, 6 and 21 may be driven by a common drive. For example, a magnetic clutch and brake assembly may be provided interconnecting the inclined conveyor 6 and the table conveyor 21. The conveyor pulleys 14 and 16 of the conveyors 5 and 6, respectively, may be drivingly interconnected by means of a gear 24 journalled on the brackets 15 and in mesh with gears on the pulleys 14 and 16 so that a synchronous drive is provided between the line conveyor 5 and the inclined conveyor 6. An overrunning clutch may be provided in the pulley 16 between the pulley shaft and the gear thereon to accommodate different speed ratios in the different directions of conveyor drive. For example, the conveyor 5 may be driven for rewind or in the direction of the arrow 26 in FIG. 1 at a speed of 162.4 feet per minute. In the same direction of travel or as indicated by the arrow 27, the inclined conveyor will be driven at 160 feet per minute. The table conveyor 21 may likewise be driven at 160 feet per minute in the direction of the arrow 28. In the opposite or feeding direction of the conveyors, the conveyor 5 may be driven at 136.6 feet per minute while the conveyor 6 is driven at the speed of 138 feet per minute. The table conveyor 21 may be driven in both directions at 160 feet per minute. In any event, the speed of the conveyors in both the feed and rewind directions are synchronized at the same speed or speeds slightly faster successively so as to preclude any wrinkling or undue distortion in the tire fabric material.

The stand 30 of the high table bias cutter 7 may be joined to the first unit 1 by a horizontal frame 31 serving also intermediately to support the inclined conveyor 6. Adjacent each unit there is provided a stile as indicated at 33 and 34 for the units 2 and 3, respectively. Such stiles between the units may be supported on transverse framing 35 interconnecting such units. Each stile is provided with a platform extending transversely of the line as shown at 36, 37 and 38 so that an operator may walk between and adjacent such units to facilitate the loading and unloading thereof. Accordingly, it will be seen that all of the units of the let-off line assembly are structurally connected and the first unit 1 is also connected to the high table bias cutter stand 30. To give some idea of the size of the structures involved, it may be stated that the illustrated embodiment discloses a common conveyor 5 for the units, the center line of which may be approximately 10 inches from the floor F and the inclined conveyor 6 which receives the fabric therefrom may elevate such material to a height in excess of 6 feet to place the same on the top of the high table bias cutter 7.

(II) *The first let-off unit 1*

Figures 2, 3:
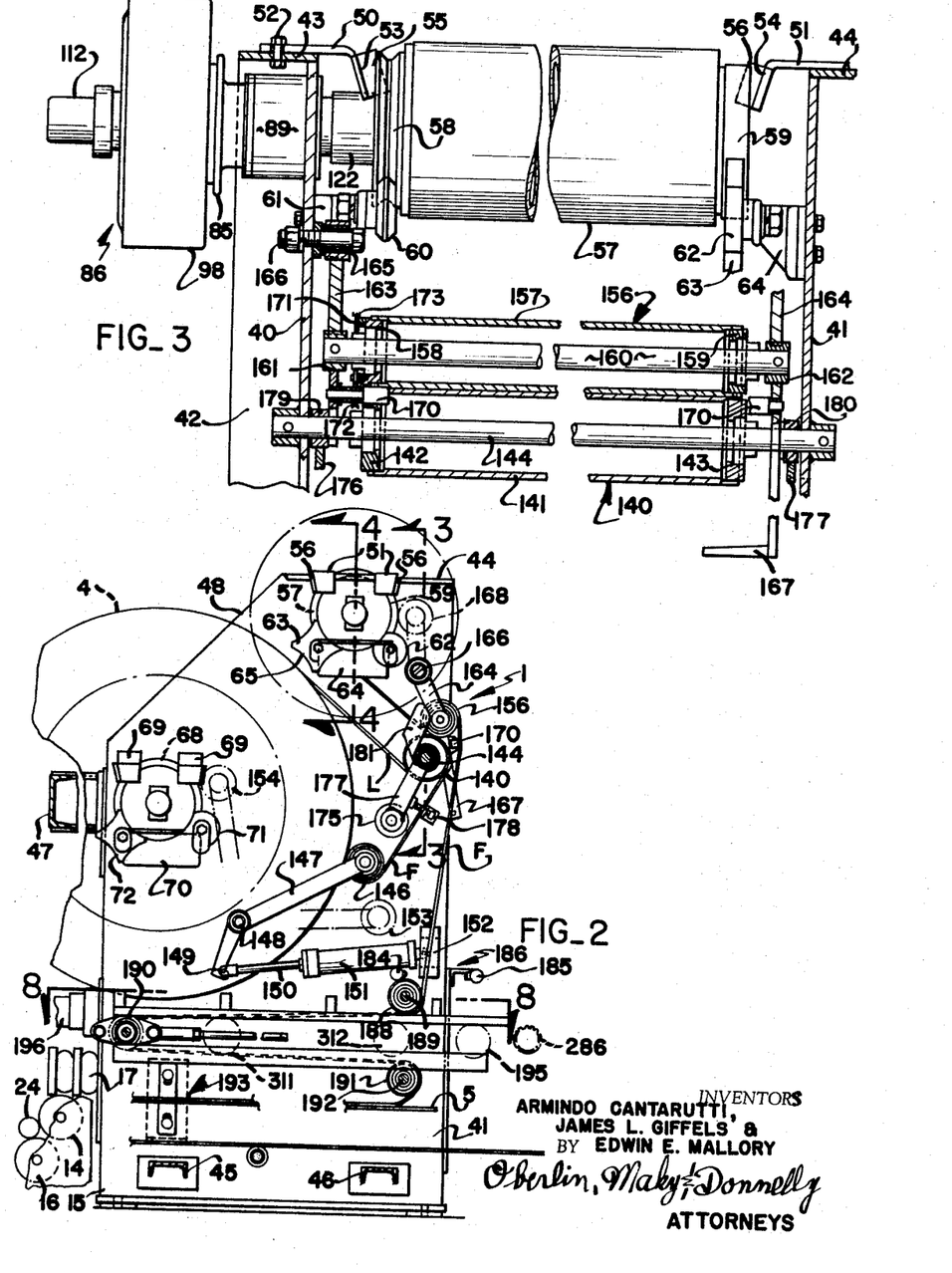
FIG. 2 is an enlarged vertical section illustrating the first or left-hand unit shown in FIG. 1.
FIG. 3 is a yet further enlarged fragmentary sectional view taken substantially on the line 3—3 of FIG. 2.

The first let-off unit 1 is substantially identical in form to the intermediate let-off unit 2 and the end or last let-off unit 3 and accordingly only the details of the unit 1 will be described, with the distinctions between the units 1, 2 and 3 being appropriately noted. Referring now additionally to FIGS. 2 and 3, it will be seen that the front stand 1 includes two upstanding parallel side plates 40 and 41, each of which have outwardly directed edge flanges 42 which may be formed integrally with the plates 40 and 41. Top flanges 43 and 44 are also provided welded to the horizontal top edges of the side plates and bridging the edge flanges 42. In addition to the various roller assemblies provided, the side plates may be joined by two channel frame members 45 and 46 at the bottom of the plates and by a U-shape channel shape member 47, the legs of which straddle the full calender stock roll 4 when in position. The upper edge of the side plates 40 and 41 may be inclined as indicated at 48.

The top flanges 43 and 44 of the side plates 40 and 41 are provided with pairs of brackets 50 and 51 which may be secured to such top flanges as by the nut and bolt assemblies indicated at 52 in FIG. 3. Such brackets are provided with downwardly inclined guide surfaces 53 and 54 which face each other. Lateral inwardly inclined flanges 55 and 56 serve as vertically extending confining guideways to facilitate the placement of a calender roll shell 57 on the proper supports at each end. As seen in FIG. 3, one end of the calender roll shell may be provided with a V-shape annular groove 58 and the opposite end is provided with a reduced diameter right circular cylindrical portion 59. The annular groove 58 mates with and is supported on two inverted V-shape rollers 60 secured to the bracket 61 which is in turn secured to the interior of the side plate 40.

The right circular cylindrical portion 59 on the opposite end of the calender roll shell 57 is supported between a cylindrical roller 62 and a star-shape drag brake 63, both of which are mounted on a bracket 64 secured to the interior of side plate 41. The star-shape drag brake 63 is provided with four arcuate surfaces 65 which will engage the right circular cylindrical portion 59 of the calender roll shell and such drag brake serves to retard rotation thereof. When one of the arcuate surfaces wears, the star-shape drag brake can readily be rotated through 90° to present a different arcuate surface to the cylindrical portion. The supports for the calender roll shell at the top of the machine shown in FIG. 3 will support the calender roll shell on which the liner L is adapted to be wrapped as the tire fabric F is payed from the stock roll 4. The stock roll comprises adjacent convolutions of liner and fabric wrapped on a calender roll shell 68 which may be identical in form to the shell 57. The stock roll shell 68 may be supported between the side plates 40 and 41 in exactly the same manner as the inner calender roll shell 57.

Guide brackets 69 laterally spaced are provided on the interior of each side plate which serve to guide the stock calender roll shell 68 into position on the supporting rollers. The rollers extending from the side plate 40 will be tapered or of the inverted V-shape groove profiles as shown at 60 in FIG. 3 and bracket 70 on the side plate 41 will be provided with the cylindrical roller 71 and the star-shape drag brake 72. The drag brake 72 will serve the same function as the drag brake 63 and operate in the same manner. The shells 68 and 57 are thus supported between the side plates 40 and 41 axially parallel and for rotational movement limited only by the drag brakes 72 and 63. For convenient reference, the shells 68 and 57, and the material supported thereby, may hereinafter be called the stock and liner rolls, respectively.

Such rotational movement of the liner and stock rolls is obtained by means of a drive motor 75 mounted on the exterior of the side plate 40 of the first unit 1. The drive motor 75 may serve to rotate the stock and liner rolls of each of the units in the let-off line assembly. The output shaft 76 of the motor 75 through a suitable chain or belt drive 77 drives a speed reducer 78 which in turn drives sprocket 79 and a horizontally extending line shaft 80 which may extend laterally adjacent the units 1 through 3 to similar speed reducers mounted on the exterior of the side plates of the units 2 and 3 driving the stock and liner rolls of such units in the same manner as now to be described. The sprocket 79 which is in a plane parallel to the side plate 40 has a drive chain 81 trained thereabout. Such drive chain is also trained about an idler sprocket 82, and an adjacent drive sprocket 83 of a clutch and brake assembly 84 for the stock roll and a drive sprocket 85 for a clutch and brake assembly 86 for the liner roll at the top of the unit. The stock and liner rolls of the units 2 and 3 may be driven in exactly the same manner from the respective speed reducers driven by the line shaft 80. The clutch and brake assemblies 84 and 86 may be identical in form and accordingly only the clutch and brake assembly 86 will be described in detail.

Reference may now be had to FIGS. 4 through 7. The side plate 40 of the stand 1 is provided with an aperture 88 having welded therein a hub 89 which supports therein a sleeve 90 secured through flange 91 to the outer end of the hub 89 by screws or the like 92. Journalled in the sleeve 90 as by the bearings 93 and 94 is a hollow shaft 95. The hollow shaft 95 extends outwardly through the hub 97 of an outer clutch drum 98 which has the sprocket 85 secured thereto as by the screws 99. The hub 97 is journalled on the shaft 95 by means of the bearings 100 and 101. The shaft 95 projects through the hub 97 and is secured by screws 102 to the hub 103 of inner clutch drum 104. The inner drum 104 may be secured to the hub 103 by nut and bolt assemblies 105. An inflatable annular air bag 107 is secured to the exterior of the inner drum 104 and is provided with friction elements 108 adapted to engage the interior 109 of the drum 98 when the air bag is inflated. When driving engagement is obtained between the inner and outer drums, the drive from the chain 81 trained about the sprocket 85 will then be imparted to the shaft 95. Two air lines may be connected at 110 and 111 to union 112 which is in turn connected to swivel joint 113. The swivel joint is in turn threaded at 114 into the hub 103 of the clutch assembly. A gooseneck air line 115 is connected by means of a union 116 to elbow 117 connected to swivel joint 113 and by means of union 118 to elbow 119 threaded into tapped aperture 120 in the interior of the inner clutch drum 104.

In this manner, air may be supplied to the bag 107 of each clutch and brake assembly 84 and 86 to pressurize the bag to engage and disengage the drive between the sprocket 85 and the shaft 95. By manipulating the pressures in the bags in the clutches 84 and 86 for the stock and liner rolls, respectively, such rolls can be rotated in different directions. The motor 75 always rotates in the same direction and drives the chain 81 in the same direction, as indicated by the arrows A in FIG. 1, rotating the sprockets 83 and 85 in opposite directions. To obtain the desired rotation of the liner and stock rolls, the pressure applied to the bags 107 in the clutches is changed.

For example, when the stock is being fed to the bias cutter 7, the following conditions exist: high pressure is applied to the bag 107 of the clutch 86 for the liner roll which causes this roll to be driven in the same direction as it is being turned by the chain 81; and low pressure is applied to the bag 107 of the clutch 84 for the stock roll which then acts as a drag brake with the shaft rotating in a direction opposite to the shell.

When the stock is being rewound, the following conditions exist: high pressure is applied to the bag 107 of the clutch 84 for the stock roll which causes the shaft to rotate in the same direction as the shell; and low pressure is applied to the bag 107 of the clutch 86 for the liner roll which acts as a drag brake.

Figure 7:
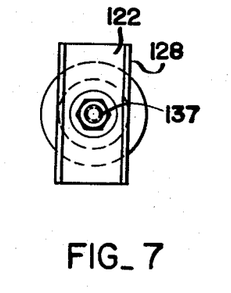
FIG. 7 is an end elevation of the shell engaging clutch or key element as seen from the line 7—7 of FIG. 4.

Air may also be supplied axially through the swivel joint 113 from one of the inlets 110 or 111 into the interior 121 of the hollow shaft 95. When the interior of the shaft 95 is thus pressurized at a predetermined pressure, chuck element 122 will be caused axially to extend from such shaft into mating engagement with the hub 123 of the calender roll shell 57 which is supported for rotation in the manner shown in FIGS. 2 and 3. The hub 123 which contains the V-shape groove 58 includes an inner portion 124 supported by webs 125, which portion contains a square aperture 126 having an outer T-slot or keyway 127 (see FIG. 5). As seen in FIG. 7, the vertical edges of the chucking element 122 are beveled as indicated at 128 to ensure an easy fit between the T-shape element or key 122 and the slot 127.

Figure 4:
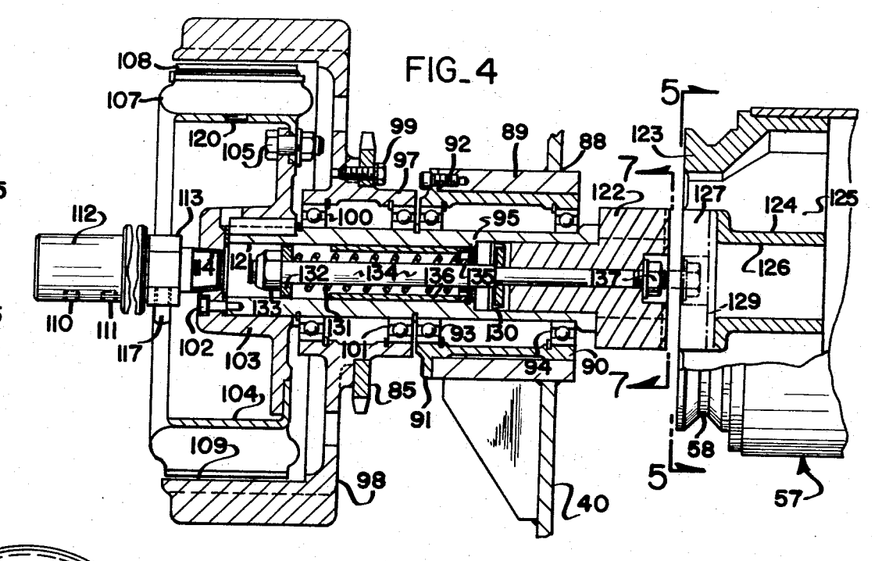
FIG. 4 is an enlarged fragmentary vertical section taken substantially on the line 4—4 of FIG. 2 illustrating the clutch and brake mounting assembly for both the stock and liner roll drives.
Figure 5:
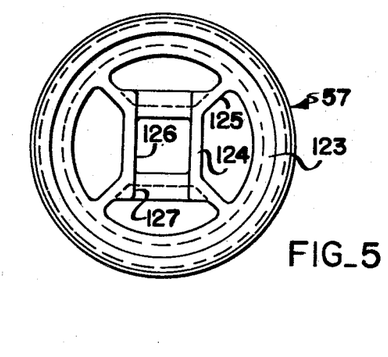
FIG. 5 is an end elevation taken substantially on the line 5—5 of FIG. 4 of the calender roll shell which may form the core of either the stock or liner roll.
Figure 6:
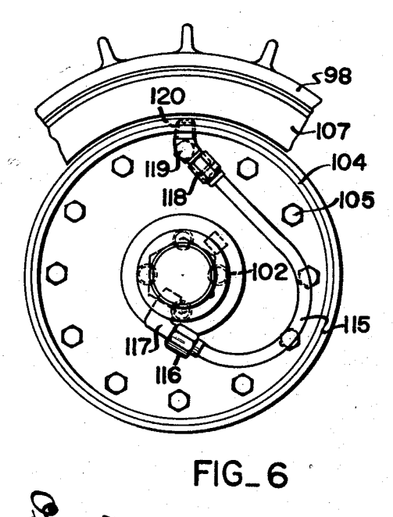
FIG. 6 is a fragmentary end elevation as seen from the left in FIG. 4 of such clutch and brake mounting assembly.

Axial movement of the chucking element to the phantom line position indicated at 129 in FIG. 4 is obtained by the pressure in chamber 121 moving piston 130 against the pressure of spring 131 which extends between a disc-shape spring retainer 132 held by nut 133 on the end of rod 134 and apertured retainer 135 held by a lock ring or the like to the interior of the shaft 95. A stop sleeve 136 will engage the retainer 132 limiting axial extension of the chucking element 122. The opposite end of the rod 134 is secured to the chucking element by nut 137. When pressure is released in the chamber 121, the spring 131 will retract the chucking element 122 from the slot 127 disengaging the driving connection.

The motor 75 is preferably of the variable speed type so that any liner or drive roll of any of the units may be drivingly engaged and then rotated at the desired speed.

Referring now again to FIGS. 2 and 3, it will be seen that the liner from the stock roll 4 is threaded about a roller 140 which includes a shell 141 mounted on hubs 142 and 143 journalled on shaft 144 extending between the side plates 40 and 41. From the roller 140, the liner L may then pass directly to the shell 57 to be wrapped thereon as the fabric and liner are payed from the stock roll 4. The fabric F may be trained about a peeler roll 146 mounted on the distal ends of bell cranks 147 pivoted to stub shafts 148 projecting inwardly from each of the side plates 40 and 41. The shorter arms of the bell cranks 147 are pivoted as at 149 to the rods 150 of piston-cylinder assemblies 151, the blind ends of which are mounted on brackets 152 secured to the interior of the plates 40 and 41. Accordingly, by extension and retraction of the piston-cylinder assemblies 151, the peeler roll 146 may be moved to and from the phantom line positions indicated at 153 and 154.

From the peeler roll 146, the fabric F then passes about the roll 140 again into contact with the liner L and then around roll 156 which comprises a shell 157 mounted on hubs 158 and 159 journalled on shaft 160. The shaft 160 is mounted in hubs 161 and 162 in arms 163 and 164, respectively, which are pivoted on bushings 165 on studs 166 projecting inwardly from the side plates 40 and 41. The arm 164 is extended to provide a handle 167 whereby the roll 156 may be pivoted upwardly to a threading position indicated at 168 in phantom lines in FIG. 2.

A rotating kicker bar of square sectional shape 170 is journalled in the arms 163 and 164 and is driven by the roll 156 through sprockets 171 and 172 mounted on the hub 158 and the kicker bar 170, respectively, and a relatively short drive chain 173 trained thereabout. The rotating kicker bar serves to kick or push the tacky fabric material F outwardly or to the right as seen in FIG. 2 to preclude the fabric from sticking to itself where it passes about roller 140. The kicker bar then serves intermittently to flick or kick the fabric F dropping from the outside of the roller 156 outwardly to preclude the same from being drawn back between the rolls 140 and 156.

An idler roller 175 is mounted on the distal ends of arms 176 and 177 pivoted on the shaft 144 of roller 140. A jack screw stop 178 (see FIG. 2) is provided limiting movement of the roller 175 in a counterclockwise direction as viewed in FIG. 2. The arms 176 and 177 are mounted on the shaft 144 by means of hubs 179 and 180 which have welded or otherwise secured thereto cam plates 181 which bear against the arms 163 and 164 causing the roller 156 to pivot about the axis of the studs 166 in a counterclockwise direction as the arms 176 and 177 move in a clockwise direction, as viewed in FIG. 2. The cam plates 181 then cause a slight separation of the rollers 140 and 156, depending upon the position of the roller 175. This relieves the pressure of roll 156 on roll 140 and permits the sliding of the liner with respect to the stock and takes up the liner slack between roll 140 and stock roll 4.

From the roller 156, the fabric F drops over the rotating kicker bar 170 and downwardly between the units 184 and 185 of a photoelectric control unit 186. Such units 184 and 185 may be mounted on brackets extending from the side plate 41 to straddle the edge of the fabric F to sense its presence or lack of presence therebetween. The fabric F then passes about a roller 188 mounted on shaft 189 extending between the side plates 40 and 41 and then about a horizontally movable dancer roll 190 of a feestoon control unit and finally about a roller 191 mounted on shaft 192 to drop onto the conveyor 5 extending horizontally through the bottom of the unit 1. A photocell control unit 193 straddling the edge of the conveyor 5 may be employed to sense the presence of the fabric F on the conveyor, which as will be recalled, comprises a plurality of laterally spaced belts.

A roll of interposed fabric and liner wound on calender shell 68 may be mounted on the stand 1 by lowering the same through the guide brackets 68 and 69 to be supported on the tapered or inverted V-shape groove rollers projecting inwardly from the side plate 40 and the drag brake 72 and roller 71 on the bracket 70 secured to the plate 41. An empty calender shell 57 may be positioned as indicated in FIG. 3 and the operator standing on the adjacent stile platform may then jog the unit 1 after engaging the clutch elements 117 with the respective roll shells 68 and 57 to facilitate manual threading of the fabric and liner. The roll 156 may be elevated to the position 168 and the liner peeled from the stock roll 4 and threaded about the roll 140 and secured to the shell 57. The roll 146 may be moved to the position 153 and the fabric threaded thereabout and about the roll 140. The roll 156 may then be returned to its full line position indicated in FIG. 2 and the fabric may then be draped thereover to hang downwardly in engagement with the kicker bar 170. The piston-cylinder assembly 151 may be pressurized to cause the peeler roll 146 to bear against the outer periphery of the stock roll 4 and the operator will check to make sure that the fabric is coming from the roll 4 in a wrinkle free and undistorted manner. With the fabric simply hanging down from the roll 156, the unit 1 is prepared for automatic operation.

(III) *The festoon unit*

Referring now to FIGS. 2, 8, 9 and 10, the festoon unit for the first unit 1 is therein illustrated in detail. The dancer roll 190 may move from its position shown in FIG. 1 to the phantom line position indicated at 195 wherein it will be to the right of the rollers 188 and 191 permitting the fabric F to drop directly from the roller 156 over the kicker bar 170 and onto the conveyor roller 5. Movement of the dancer roll 190 from the full line to the phantom line position 195 in the illustrated embodiment may be approximately 40 inches. This movement is obtained by means of a piston-cylinder assembly 196 which may have a 2½ inch bore and a 10 inch stroke. Such piston-cylinder assembly may be mounted on a bracket 197 secured to the front flange 42 of the side plate 40. The rod 198 of such piston-cylinder assembly is connected to an elongated rack 199 which is in driving engagement with pinion 200 keyed to shaft 201 of the dancer roll 190.

Figure 10:
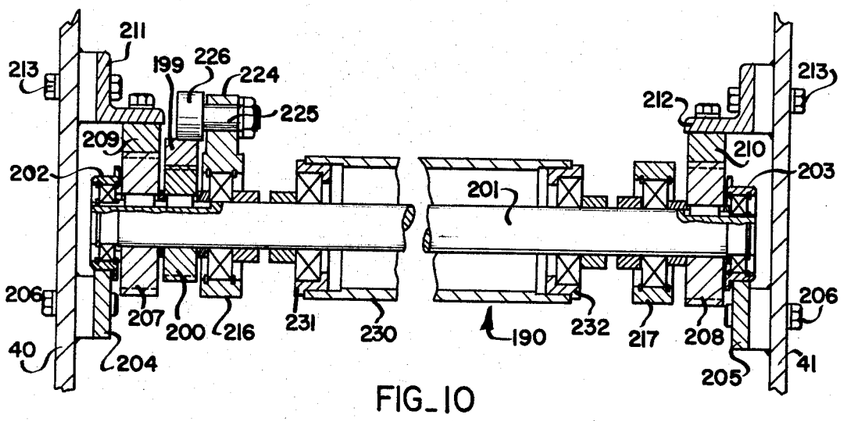
FIG. 10 is an enlarged fragmentary vertical section taken substantialy on the line 10—10 of FIG. 9.

Referring now particularly to FIG. 10, it will be seen that the opposite ends of the shaft 201 have journalled thereon flanged wheels 202 and 203 which ride on rails 204 and 205 secured to the interior of the side plates 40 and 41, respectively by suitable spacers and fasteners passing therethrough as indicated at 206. Inwardly adjacent the wheels 202 and 203 pinions 207 and 208 are keyed to the shaft 201. These pinons are in mesh with stationary racks 209 and 210, respectively, which are supported by angle bars 211 and 212 secured to the interior of the side plates 40 and 41 through suitable spacers by means of the fasteners indicated at 213. The rack 209 may have secured thereto a laterally offset guide 214 confining and guiding the back of the rack 199 as it is reciprocated by the piston-cylinder assembly 196. The racks 209 and 210 may be identical in form being of the same length and laterally aligned and parallel to each other.

Inwardly adjacent the pinion 200 and the pinion 208, the shaft 201 has journalled thereon yokes 216 and 217 to which connecting rods 218 and 219 are secured through suitable clevises 220 and 221. The connecting rods 218 and 219 may be connected to yokes 222 and 223 of the next adjacent let-off unit as shown in detail in FIG. 11. The yoke 217 may be of the double ended type whereby clevises such as 221 may be secured to either end. However, the yoke 216 provides a connection for a clevis only at one end and additionally includes an upper projection 224 through which is secured a stud 225 supporting rack hold-down roller 226. The yoke 217, however, being of the double ended type, may be identical in form to the yokes 222 and 223 of the next adjacent unit or any intermediate unit. The dancer rolls of all of the let-off units in the let-off line assembly are thus interconnected for movement in unison by means of the yokes and connecting rods illustrated and such dancer roll movement for the entire line is obtained by the piston-cylinder assembly 196.

Figure 8:
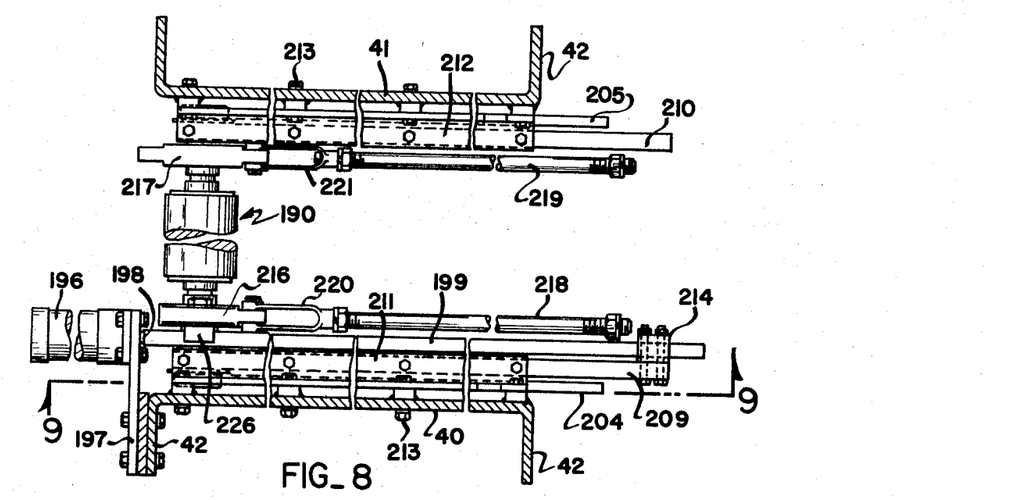
FIG. 8 is a fragmentary horizontal section taken substantially on the line 8—8 of FIG. 2 illustrating the dancer roll drive of the festoon for the first left-off unit.
Figure 9:
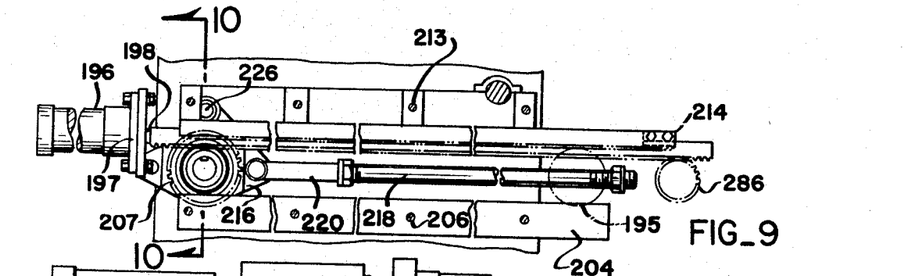
FIG. 9 is a fragmentary vertical section of such drive taken substantially on the line 9—9 of FIG. 8.

The pinion 200 in engagement with the reciprocating rack 199 may, for example, be a 30 teeth 10 P. gear having a 3.00 P.D. and 14½° P.A. The pinions 207 and 208 may be slightly larger gears having 40 teeth and a 4.000 P.D. while having the same pitch and pitch angle as the pinion 200. It can now be seen that as the rod 198 of the piston-cylinder assembly extends the rack 199, it will push the dancer roll assembly to the right as seen in FIGS. 8 and 9 since the shaft 201 is free to move horizontally by means of the flanged wheels 202 and 203 supporting the same on the rails 204 and 205. Movement of the shaft 201 to the right will cause the somewhat larger pinions 207 and 208 to be rotated by the fixed racks 209 and 210 and this in turn causes the pinion 200 to be rotated in the same direction moving along the reciprocating rack 199 and being rotated thereby in a counterclockwise direction as viewed in FIG. 9 or a direction opposite to that which would normally occur if the shaft 201 were fixed. By choosing the appropriate gear ratios between the pinions 200, 207 and 208, the stroke of the piston-cylinder assembly may be quadrupled in the movement of the dancer roll 190. The racks 209 and 210 in engagement with the pinions 207 and 208 keyed to the shaft 201 also serve as a squaring mechanism to maintain the shaft 201 normal to the side plates 40 and 41 and in parallelism with the other rollers in the let-off line unit. Retraction of the piston-cylinder assembly 196 will of course, move the dancer roll 190 to the left as seen in FIGS. 8 and 9. It is noted that the dancer roll assembly 190 comprises a shell 230 mounted on hubs 231 and 232 which are journalled on the shaft 201 so that rotation of the shaft 201 will not affect rotation of the shell 230 or the roll assembly which during operation of the particular unit will have the tire fabric trained thereabout.

Figure 11:
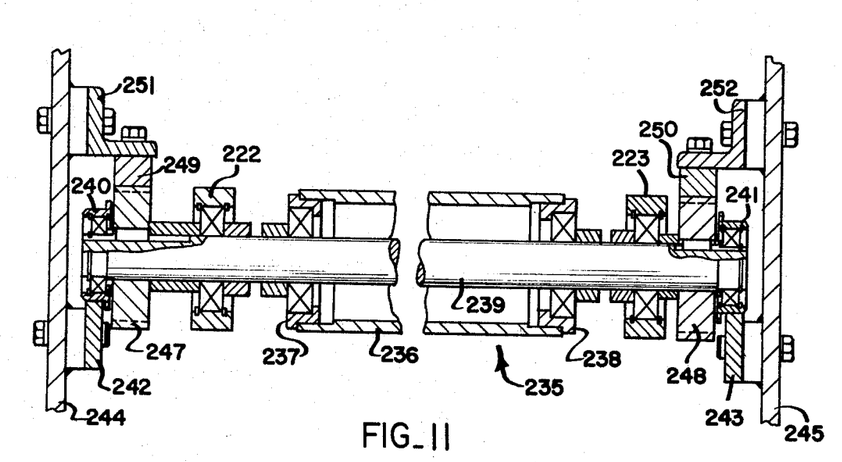
FIG. 11 is a similar vertical section only taken through the dancer roll assembly of an intermediate unit.

Referring now additionally to FIGS. 1 and 11, it will be seen that the dancer roll unit 235 of the unit 2 or any intermediate unit is similar to the dancer roll 190 of the first unit in that such roll comprises a shell 236 mounted on hubs 237 and 238 journalled on shaft 239, the ends of which are journalled in flanged wheels 240 and 241 riding on rails 242 and 243 secured by suitable fasteners through spacers to the interiors of the side plates 244 and 245, respectively, of the unit 2. The double ended yokes 222 and 223, which are journalled on the shaft 239 and connected by means of the connecting rods 218 and 219 to the first or preceding unit and also by similar connecting rods 246 to the next or succeeding unit 3, will cause the dancer roll 235 to move horizontally back and forth in unison with the roll 190. Pinions 247 and 248 keyed to the shaft 239 inwardly adjacent the wheels 240 and 241 are in mesh with fixed racks 249 and 250 secured to angles 251 and 252 in turn secured by suitable fasteners through spacers to the side plates 244 and 245, respectively, of such unit 2. Such racks will maintain the roll assembly 235 in parallelism with the stock and liner rolls 254 and 255 of such units as well as the other peeler, idler and threading rolls of such unit. The dancer roll assembly 256 of the end or final unit 3 is similarly constructed and maintained in parallelisms with the stock and liner rolls 257 and 258 of such unit.

The units 2 and 3 in FIG. 1 are shown schematically with different amounts of the fabric on the respective stock rolls 254 and 257 and, of course, different amounts of liner on the liner rolls 255 and 258. It is noted that the fabric peeler rolls 260 and 261 of the units 2 and 3, respectively, will be maintained in contact with the outer periphery of the stock roll by the piston-cylinder assemblies 262 and 263, but the paths of the liner and fabric will otherwise be substantially the same. As an example, the substantially full stock roll as shown at 257 for the unit 3 may be approximately 3 feet in diameter and a substantially full liner roll as indicated at 255 for the unit 2 may be approximately 2 feet in diameter. The empty shell, however, may be approximately 10 inches in diameter and it will be seen that the paths of the liner and fabric will be governed to some extent by the amount of fabric and liner on the stock roll and the liner on the liner roll.

(IV) Dancer roll position responsive controls

It will here be appreciated that the feed of the fabric material to the bias cutter 7 must of necessity be of an intermittent nature in that the fabric must be stopped while the actual bias cut is being made. Although such cuts can be made quite rapidly and 18 to 20 cuts can be made per minute, the fabric must nonetheless be stopped. Accordingly, the bias cutter conveyor 21 as well as the inclined conveyor 6 and the let-off line assembly conveyor 5 must move in intermittent fashion during the actual bias cutting operation. If the liner and stock rolls were also to be moved in such intermittent fashion, it would require the drive motor 75 to be stopped and started precisely and this would require a tremendous expenditure of energy. Accordingly, the dancer rolls in each unit are employed to permit the motor 75 to run continuously at the proper speed so that the fabric will be fed from the selected unit to the bias cutter at the controlled speed and without distortion or wrinkling.

Figure 12:
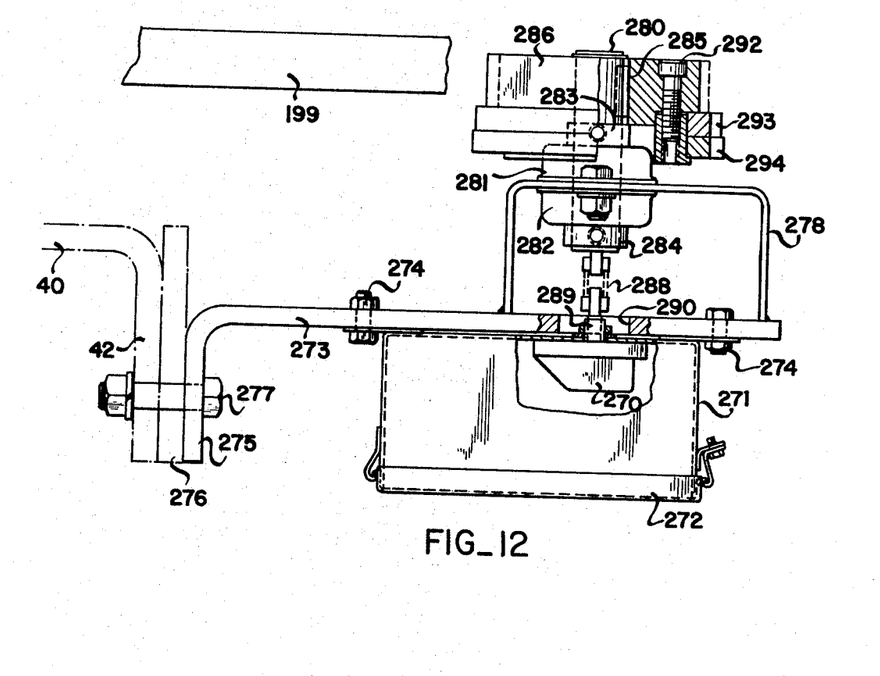
FIG. 12 is an enlarged top plan view partially broken away and in section of the let-off control unit.
Figure 13:
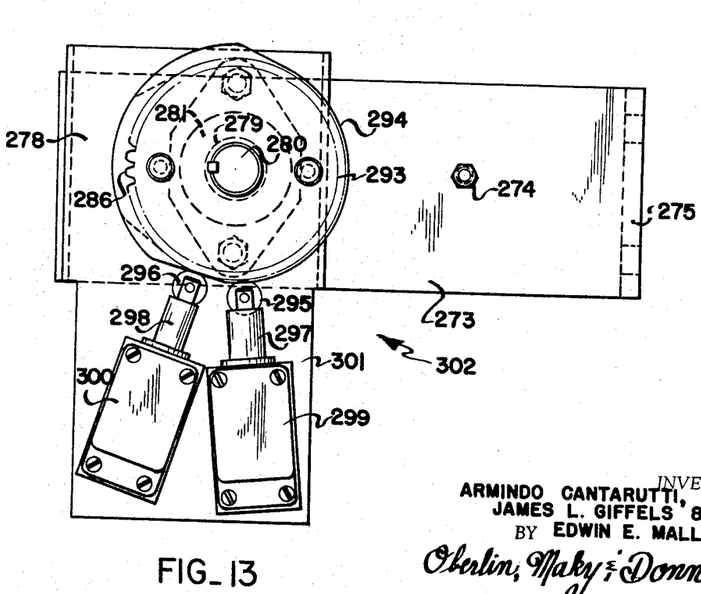
FIG. 13 is an elevation of such unit as seen from the top in FIG. 12.
Figure 14:
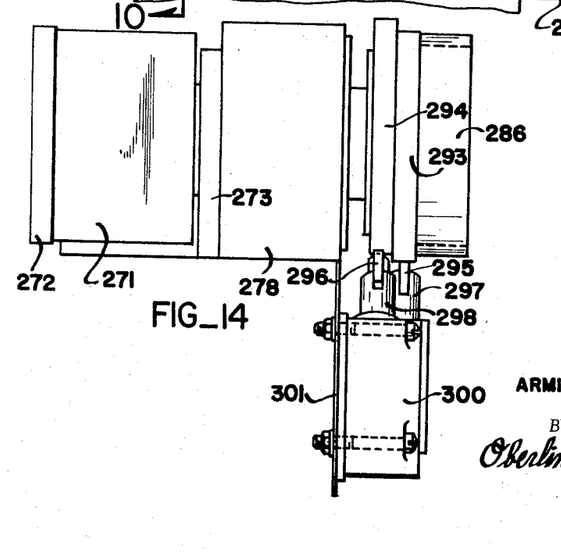
FIG. 14 is an end elevation of such speed control unit as seen from the right in FIG. 12.

Referring now to FIGS. 12 through 14 in addition to FIG. 1, the speed of the motor 75 is controlled by a variable resistor 270 mounted within enclosure 271 having a removable access cover 272. The enclosure 271 is in turn mounted on bracket plate 273 by means of suitable fasteners indicated at 274. The bracket plate 273 is mounted on the rear edge flange 42 of the side plate 40 of the first unit 1. The bracket plate 273 may be provided with a flange 275 held to the flange 42 through spacer 276 by nut and bolt assemblies or the like indicated at 277. A U-shape mounting bracket 278 may be welded or otherwise secured to the interior of the bracket plate 273. The bight portion of the bracket is provided with an aperture 279 through which shaft 280 extends, such shaft being supported in journals 281 and 282 secured as indicated in FIG. 13 to the bracket 278. Spacing collars 283 and 284 are provided immediately adjacent the journals 281 and 282, respectively. On the outer end of the shaft 280, there is secured by suitable key 285 a pinion 286 which is in mesh with the rack 199 driven for reciprocation by the piston-cylinder assembly 196. The position of this pinion with respect to the rack is shown in FIG. 9.

The inner end of the shaft 280 is connected through flexible coupling 288 to the shaft 289 of the rotating contact of the variable resistor. Such shaft extends through aperture 290 in the bracket plate 273 provided therefor. Secured to the side of the pinion 286 by suitable fasteners indicated at 292, are two cams 293 and 294 which engage rollers 295 and 296 mounted on plungers 297 and 298 of limit micro switches 299 and 300. Such switches may be mounted on plate 301 which constitutes a downward extension of the bight portion of the bracket 278. The control unit which comprises the variable resistor 270 and the limit switches 299 and 300 may generally be designated control unit 302 and the position of such control unit is indicated in FIG. 1 adjacent the unit 1. The control unit 302, will, of course, sense the position of all of the dancer rolls of the various units in the let-off line assembly since they are all operated in unison. The variable resistor 270, limit switch 299 and limit switch 300, which make up the control unit 302, all operate in response to the position of the dancer roll. The variable resistor 270 may be employed to control the speed of the motor 75, the limit switch 300 may be employed to indicate when the festoon is empty interlocking the cutting and advancing of the bias cutter, and finally, the limit switch 299 may be employed to indicate when the festoon is full to disengage the air operated clutch and brake assemblies, shown in detail in FIG. 4.

(V) Operation

Referring now to FIGS. 1 and 2, each of the units 1 through 3 may be loaded with tire fabric material rolls of varying types and sizes which come from the calender having layers of liner interposed between the fabric layers. Suitable overhead cranes or the like may be employed to facilitate the lowering of the stock containing calender roll shells through the guide brackets 69 to be supported by the four elements including the two tapered rolls 60 on one side of the stand and the cylindrical roll 71 and drag brake element 72 on the opposite side of the stand. An empty liner roll or shell 57 may similarly be positioned through the pairs of guide brackets 50 and 51 on the top of the stands to be supported on the taper rolls 60 at one end, such rolls fitting in the groove 58, and the cylindrical roll 62 and the drag brake unit 63 engaging the cylindrical surface 59 on the opposite end of the shell and at the opposite side of the stand.

Although the let-off line assembly will normally be controlled by the operator at the front of the bias cutter 7 or to the left of such bias cutter as seen in FIG. 1, manual override controls may be provided for each stand and the operator may now engage the clutch and brake units 85 and 86 causing the chucking elements or keys 122 to engage in the keyways or slots 127 in the ends of the thus positioned stock and liner rolls. By jogging the clutch and brake assemblies, the operator standing on the adjacent stile platform may now manually thread the fabric and liner as indicated in FIG. 2. The peeler roll 146 may be retracted by extension of the piston-cylinder assembly 151 to the position indicated at 153. Similarly, the handle 167 may be elevated moving the roll 156 to the position indicated at 168 in FIG. 2. The liner L is then wrapped about the roller 140 and secured to the shell 57. The fabric is wrapped about the peeler roll 146, about the liner in engagement with the roll 140, and reversely about the roll 156 to hang down over the rotatable kicker bar 170, when the roller 156 is positioned in the full line location shown in FIG. 2. The piston-cylinder assembly 151 may be retracted to bring the roll 146 into engagement with the outer periphery of the stock roll 4 and the operator will see that the fabric and liner are being properly payed from the stock roll with the liner being wound on the shell 57. The unit is then ready for operation. The fabric F will generally hang down somewhat short of the photocell control unit 186 which is utilized to stop the rewinding operation. The dancer roll 190 will initially be in the position indicated at 195 in FIG. 2 so that the fabric F will drop from the kicker bar 170 directly through the photocell unit, between the roll 190 on the right and the rolls 188 and 191 on the left, onto the conveyor 5. All of the units in the line assembly may similarly be loaded.

When the operator desires to process a particular fabric, he will select the unit which contains such fabric, for example, unit 1, and energize the clutch and brake units 84 and 86 so that the motor 75 rotating at a preselected slow rate of speed will drive the liner roll causing the fabric F to drop down between the elements 184 and 185 of the unit 186 and to the left of the dancer roll 190 in the position 195 onto the conveyor 5.

When the stock is being fed to the bias cutter, the operator will have applied high pressure to the bag 107 of the clutch 86 for the liner roll causing this roll to be driven in the same direction as it is being turned by the chain 81. This will, of course, pull the liner and stock from the stock roll. Low pressure is also applied to the bag 107 of the clutch 84 for the stock roll which then acts as a drag brake with the shaft rotating in a direction opposite to that of the shell.

The conveyor 5 will now pick up the fabric moving it to the left through the photocell unit 193 speeding up both the conveyor 5 and the motor 75. The motor 75, of course, will be providing drive to the other units in the line through the line shaft 80, but the various clutch and brake assemblies on the stock and liner rolls of such units will be disengaged. The fabric F is now transported along the conveyor 5 and drops onto the inclined conveyor 6 to be carried up onto the conveyor 21 of the high table bias cutter 7. The fabric will now pass through a photocell unit 310 mounted on the bias cutter and such unit, signalling the presence of the fabric on the bias cutter, will now start the operation of the cylinder 196 causing the rolls 190 to move and form the festoon. The switch 300, which signals an empty festoon will be employed to interlock the cutting and advancing of the bias cutter. The piston-cylinder assembly 196 will now be retracted causing the dancer roll assembly 190 to move from its position 195 between the rolls 188 and 191 as the conveyors 5, 6 and 21 stop to permit the bias cut to take place.

During the continued cutting operation, the dancer roll 190 will generally move between the phantom line positions indicated at 311 and 312 in FIG. 2. In the roll position 311, the slowest speed of the motor 75 is obtained by means of the variable resistor 270 in that the festoon is substantially full. In the position of the dancer roll at 312, the festoon will be substantially empty and the fastest speed of the motor 75 will be obtained in this position. As the festoon and dancer roll moves back and forth, it will, of course, take up any slack in the fabric automatically maintaining the fabric at the proper low tension for paying onto the bias cutter while precluding formation of wrinkles or undue distortion. As the festoon becomes full, the motor will, of course, slow down and when substantially empty, the motor will speed up, all automatically in response to the position of the dancer roll. The switch 299 will, of course, disengage the clutch and brake units 84 and 86 when the festoon is completely full. However, in no case need the motor 75 be stopped because the starting and stopping of the unit can be done through the air bags 107 of clutches 84 and 86.

When the unit 1 is completely exhausted, another selected unit may similarly be energized to cause the fabric therein to be fed to the bias cutter. However, if the operator should require a different size or type of fabric in the materials program for the various services of the tire building drum type machines, without the unit 1 being completely exhausted, the unused fabric may be rewound into the unit 1 before the next selected unit fabric is fed to the bias cutter table.

In order to rewind the stock, the operator will apply high pressure to the bag 107 of the clutch 84 for the stock roll causing the shaft thereof to rotate in the same direction as the shell. This then pulls the liner from the liner roll. Low pressure is applied to the bag 107 of the clutch 86 for the liner roll which acts as a drag brake maintaining proper liner tension.

The drive for the conveyors 5, 6 and 21 may be disengaged and moved in reverse direction by the contact of the fabric therewith. However, a reverse drive may readily be provided for the conveyors. The roller 18 mounted on the brackets 15 will be employed to limit peel off of the fabric rearwardly keeping such fabric from being elevated from the conveyor 5 as it drives the conveyors 5 and 6 in a rearward direction. The photocell unit 186 will signal the position of the end of the fabric stopping such rewinding operation. The operator may then feed fabric from another selected unit to the bias cutter in the same manner as described in connection with unit 1.

It can now be seen that there is provided a let-off line assembly for a bias cutter which will automatically pay the tire fabric from a selected unit of the plurality of units to the cutter and return the unused paved out portion of the fabric to the let-off unit before fabric from another selected unit is delivered to the cutter. Moreover, the dancer roll assembly of each of the units permits the fabric to be fed continuously and without wrinkling or distortion despite the intermittent advancement of the fabric at the cutter. With the disclosed let-off line assembly, a single drive and control unit is employed with the dancer roll assemblies of each of the units and a single motor drive for the liner and fabric rolls of each unit may also be provided.

Accordingly, with the present invention, a more highly automated production of tire materials is obtained facilitating a more efficient employment of the drum type tire building machines and the associated servicers. Moreover, the cutter can be employed substantially continuously with little down time for tire material supply roll changes or for changeover to different sizes and types of material.

Other modes of applying the principle of the invention may be employed, change being made as regards the details described, provided the features stated in any of the following claims or the equivalent of such be employed.

We, therefore, particularly point out and distinctly claim as our invention:

1. A let-off unit for a tire fabric bias cutter and the like comprising a stand including vertically extending parallel side plates, means operative to support a stock roll including a tire fabric material and liner therefor wrapped thereon between said plates, means operative to support a liner roll between said plates to receive the liner on such stock roll as the fabric is payed therefrom, drive means selectively engageable with such stock and liner rolls, festoon means operative to increase and decrease the path of such fabric is said unit as it is payed from such stock roll, and means responsive to the operation of said festoon means operative to control the speed of said drive means.

2. A let-off unit as set forth in claim 1 wherein said festoon unit includes a dancer roll about which such fabric is trained, and means operative to reciprocate said dancer roll and simultaneously to control the speed of said drive means.

3. A let-off unit as set forth in claim 2 wherein said means operative to reciprocate said dancer roll comprises a piston-cylinder assembly operated rack, a pinion engaged with said rack, and a variable resistor operated by said pinion operative to control the speed of said drive means.

4. A let-off unit as set forth in claim 3 including a pair of rail guides on said side plates, shaft means extending through said dancer roll, wheel means on said shaft means engaged with said rail guides, a pinion keyed to said shaft means and in engagement with said piston-cylinder operated rack means, stationary rack means mounted on said parallel side plates, and respective pinion means keyed to said shaft means in engagement with said stationary rack means.

5. A let-off unit as set forth in claim 4 wherein said pinions in engagement with said stationary rack means have a larger number of teeth and a greater pitch diameter than the pinion on said shaft means engaging said piston-cylinder operated rack means whereby the movement of said piston-cylinder operated rack means will be multiplied in the movement of said shaft means along said rail guide means.

6. A let-off unit as set forth in claim 5 including means responsive to the position of said piston-cylinder operated rack means obtaining the slowest speed of said drive means and also functioning to disengage said drive means.

7. A let-off unit as set forth in claim 6 wherein said means to disengage said drive means comprises a limit switch, a cam mounted on said pinion operating said variable resistor, and means responsive to the position of said cam to operate said limit switch.

8. A let-off unit as set forth in claim 1 including bell cranks pivoted to the respective side plates, a peeler roll journalled between said bell cranks, and piston-cylinder means connected to said bell cranks operative to swing said peeler roll against such stock roll whereby to peel such fabric from such stock roll regardless of the diameter thereof.

9. A let-off unit as set forth in claim 8 including an idler roll journalled between said side plates, a movably mounted threading roll above and adjacent said idler roll, means to thread such liner from such stock roll to such liner roll directly about said idler roll, and means to thread such fabric from such stock roll about said peeler roll and between said idler and threading rolls to be payed through said festoon means from said unit.

10. A let-off unit as set forth in claim 9 including a kicker bar adjacent said threading roll and rotated thereby operative to prevent such fabric from encircling said threading roll.

11. A let-off unit as set forth in claim 10 including a tension roll adjacent said idler roll on the opposite side thereof from said threading roll, and means responsive to the position of said tension roll with respect to said idler roll to control the position of said threading roll with respect to said idler roll.

12. A let-off unit as set forth in claim 11 wherein said tension roll is journalled on a shaft, said shaft being mounted between the distal ends of a pair of arms pivoted coaxially with said idler roll, a movable support for said threading roll, and cam means on at least one of said arms supporting said tension roll operative to engage said support for said threading roll to move said threading roll in response to movement of said tension roll.

13. A let-off unit as set forth in claim 1 wherein said means operative to support such stock and liner rolls each comprise supporting rollers journalled on the respective side plates, and guide means directly above said supporting rollers operative to facilitate the guiding and placement of such stock and liner rolls on said supporting rollers.

14. A let-off unit as set forth in claim 13 including drag brakes operative to engage such stock and liner rolls to retard rotation thereof.

15. A let-off unit as set forth in claim 14 wherein said drag brakes each comprise star-shaped rotatable members having arcuate roll engaging surfaces whereby said drag brakes may be rotated to present different arcuate surfaces to such stock and liner rolls as such surfaces wear.

16. A let-off unit as set forth in claim 15 wherein said guide means comprise brackets secured to the respective side plates vertically to guide and confine such stock and liner rolls to facilitate the placement thereof on said supporting rollers.

17. A let-off unit as set forth in claim 1 wherein said drive means comprises a variable speed motor, a speed reducer driven by said motor, endless drive means interconnecting said speed reducer and a clutch and brake assembly for said stock and liner rolls, respectively, and means operative selectively to engage and disengage said clutch and brake assemblies.

18. A let-off unit as set forth in claim 17 wherein the driven element of each clutch and brake assembly includes an axially extensible key adapted drivingly to engage the stock and liner rolls, respectively.

19. A let-off unit as set forth in claim 18 including a rotary union on each said clutch and brake assembly, means operative to supply air pressure through each rotary union selectively to engage the respective clutch and brake assembly and to extend the respective key.

20. A let-off unit as set forth in claim 19 including spring means operative to return said keys upon release of such air pressure.

21. In combination, a tire fabric cutter, a plurality of tire fabric let-off units, means operative to pay fabric from a selected one of said let-off units to said cutter, and means operative to return the unused payed out portion of such fabric to said let-off unit, both of said means including a common drive.

22. In combination a tire fabric cutter, a plurality of tire fabric let-off units, means operative to pay fabric from a selected one of said let-off units to said cutter, and means operative to return the unused payed out portion of such fabric to said let-off unit; each let-off unit including means operative to support a stock roll including such tire fabric and a liner therefor wrapped thereon, means operative to support a liner roll to receive the liner from such stock roll as such fabric is payed therefrom, drive means selectively engageable with such stock and liner rolls, and festoon means operative to increase and decrease the path of such fabric as it is payed from such stock roll.

23. The combination set forth in claim 22 including conveyor means interconnecting said let-off units and operative to place such fabric therefrom on such tire fabric cutter.

24. The combination set forth in claim 23 including means responsive to the position of such fabric on such cutter operative to initiate operation of said festoon means.

25. The combination set forth in claim 24 including a drive motor for the stock and liner rolls of each unit, and means responsive to the condition of said festoon means operative to control the speed of said drive motor.

26. The combination set forth in claim 25 including fabric position sensing means for each unit adjacent said conveyor operative to sense the position of such fabric on said conveyor to increase the speed thereof.

27. The combination set forth in claim 26 including means operative to sense the position of fabric in each unit to halt the return of the unused payed out portion of such fabric to the selected let-off unit.

28. The combination set forth in claim 27 including a speed reducer for each unit, a line shaft interconnecting said speed reducers, said line shaft being driven by said variable speed motor.

29. The combination set forth in claim 28 including endless drive means connecting the speed reducers of each unit and the respective stock and liner rolls, and respective clutch and brake assemblies selectively operable to drive such stock and liner rolls in opposite directions.

30. In combination, a tire fabric cutter, a plurality of let-off units for said cutter each comprising, a stand including vertically extending parallel side plates, means operative to support a stock roll including a tire fabric material and liner therefor wrapped thereon between said plates, means operative to support a liner roll between said plates to receive the liner from such stock roll as the fabric is payed therefrom, drive means selectively engageable with such stock and liner rolls, festoon means operative to increase and decrease the path of such fabric in each unit as it is payed from such stock roll, and means responsive to the operation of said festoon means operative to control the speed of said drive means.

31. The combination set forth in claim 30 including a horizontal conveyor operative to receive such fabric from each unit and deliver the same to said cutter.

32. The combination set forth in claim 31 including means responsive to the position of such fabric on said cutter operative to initiate operation of said festoon means.

33. The combination set forth in claim 32 including means responsive to the position of such fabric on said conveyor operative to increase the speed of said conveyor.

34. The combination set forth in claim 33 including a piston-cylinder assembly operative simultaneously to operate the festoon means of each unit.

35. The combination set forth in claim 31 including an inclined conveyor interconnecting said horizontal conveyor and said tire fabric cutter, and means drivingly interconnecting said inclined and horizontal conveyors.

36. In combination, a tire fabric cutter, a let-off stand for said cutter comprising vertically extending supports, means operative to mount a stock roll between said supports including a tire fabric material and liner therefor wrapped thereon, means operative to mount a liner roll between said supports to receive the liner from such stock roll as the fabric is payed therefrom, drive means for such stock and liner rolls including respective clutches, means to energize one of said clutches to rotate such stock and liner rolls in one direction, and means to energize the other of said clutches to rotate such stock and liner rolls in the opposite direction.

37. The combination set forth in claim 36 including respective drive shafts for such stock and liner rolls, respective drive sprockets for said shafts, and means operative to rotate said sprockets in opposite directions, said respective clutch means interconnecting the respective sprockets and shafts.

38. The combination set forth in claim 37 including an endless drive chain operative to rotate said sprockets in opposite directions.

39. The combination set forth in claim 38 wherein said clutches are of the annular air bag type, and means to supply high pressure to the bag of the liner roll clutch to feed fabric material to the bias cutter.

40. The combination set forth in claim 39 including means to supply high pressure to the bag of the stock roll clutch to rewind fabric material on the stock roll.

41. The combination set forth in claim 36 wherein said clutches are of the annular air bag type, and means selectively to supply high pressure air to said liner and stock roll clutches operative to feed fabric to the bias cutter and rewind it on the stock roll, respectively.

42. The combination set forth in claim 41 including means selectively to supply low pressure air to said stock and liner roll clutches operative to retard rotation thereof as such fabric is fed to the bias cutter and rewound on the stock roll, respectively.

References Cited

UNITED STATES PATENTS

| | | | |
|---|---|---|---|
| 2,671,495 | 3/1954 | Iredell et al. | 156—406 X |
| 2,918,105 | 12/1959 | Harris | 156—406 X |
| 3,017,312 | 1/1962 | Kraft | 156—406 X |
| 3,081,959 | 3/1963 | Goodwin | 156—405 X |

EARL M. BERGERT, *Primary Examiner.*

HAROLD ANSHER, *Examiner.*